(12) United States Patent
Chen

(10) Patent No.: US 7,576,286 B2
(45) Date of Patent: Aug. 18, 2009

(54) PROTECTIVE SLEEVE FABRICATED WITH HYBRID YARN HAVING WIRE FILAMENTS AND METHODS OF CONSTRUCTION

(75) Inventor: Ming-Ming Chen, West Chester, PA (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 11/684,984

(22) Filed: Mar. 12, 2007

(65) Prior Publication Data

US 2007/0275199 A1    Nov. 29, 2007

Related U.S. Application Data

(60) Provisional application No. 60/786,847, filed on Mar. 29, 2006.

(51) Int. Cl.
H01B 7/08 (2006.01)
(52) U.S. Cl. .................................. 174/117 M
(58) Field of Classification Search ............ 174/36, 174/117 M
See application file for complete search history.

(56) References Cited

U.S. PATENT DOCUMENTS

| | | | |
|---|---|---|---|
| 4,290,260 A | 9/1981 | Wasserman |
| 4,302,926 A | 12/1981 | Maixner et al. |
| 4,313,998 A | 2/1982 | Pivot et al. |
| 4,755,716 A | 7/1988 | Hayafune et al. |
| 4,777,789 A | 10/1988 | Kolmes et al. |
| 4,838,017 A | 6/1989 | Kolmes et al. |
| 4,886,691 A | 12/1989 | Wincklhofer |
| 4,912,781 A | 4/1990 | Robins et al. |
| 5,062,161 A | 11/1991 | Sutton |
| 5,423,168 A | 6/1995 | Kolmes et al. |
| 5,427,880 A | 6/1995 | Tamura et al. |
| 5,632,137 A | 5/1997 | Kolmes et al. |
| 5,670,284 A | 9/1997 | Kishi et al. |
| 5,699,680 A | 12/1997 | Guerlet et al. |
| 5,721,179 A | 2/1998 | Shi et al. |
| 5,740,734 A | 4/1998 | Mori et al. |
| 5,806,295 A | 9/1998 | Robins et al. |
| 5,855,169 A | 1/1999 | Mori et al. |
| 5,881,547 A | 3/1999 | Chiou et al. |
| 6,016,648 A | 1/2000 | Bettcher et al. |
| 6,033,779 A | 3/2000 | Andrews |
| 6,132,871 A | 10/2000 | Andrews |

(Continued)

FOREIGN PATENT DOCUMENTS

EP    0 498 216 A1    8/1992

(Continued)

*Primary Examiner*—Chau N Nguyen
(74) *Attorney, Agent, or Firm*—Robert L. Stearns; Dickinson Wright PLLC

(57) ABSTRACT

A fabric sleeve and hybrid yarn filament used in construction of the sleeve for protecting elongate members against at least one of EMI, RFI or ESD, and methods of construction of the sleeve and hybrid yarn filament. The sleeve includes at least one interlaced hybrid yarn filament having a non-conductive filament and at least one conductive wire filament overlying an outer surface of the non-conductive filament. The hybrid yarn filament is arranged in electrical communication with itself or other hybrid yarn filaments to provide uniform shielding against EMI, RFI, and/or ESD.

25 Claims, 3 Drawing Sheets

U.S. PATENT DOCUMENTS

| | | |
|---|---|---|
| 6,216,431 B1 | 4/2001 | Andrews |
| 6,328,080 B1 | 12/2001 | Winters |
| 6,363,703 B1 | 4/2002 | Kolmes |
| 6,639,148 B2 | 10/2003 | Marks |
| 6,777,056 B1 | 8/2004 | Boggs et al. |
| 6,779,330 B1 | 8/2004 | Andrews et al. |
| 6,800,367 B2 | 10/2004 | Hanyon et al. |
| 6,803,332 B2 | 10/2004 | Andrews |
| 6,843,078 B2 | 1/2005 | Rock et al. |
| 7,102,077 B2 | 9/2006 | Aisenbrey |
| 2004/0065072 A1 | 4/2004 | Zhu et al. |
| 2004/0237494 A1 | 12/2004 | Karayianni et al. |
| 2005/0028512 A1 | 2/2005 | Boni |
| 2005/0124249 A1 | 6/2005 | Uribarri |

FOREIGN PATENT DOCUMENTS

| | | |
|---|---|---|
| FR | 2643914 | 9/1990 |
| FR | 2652826 | 4/1991 |

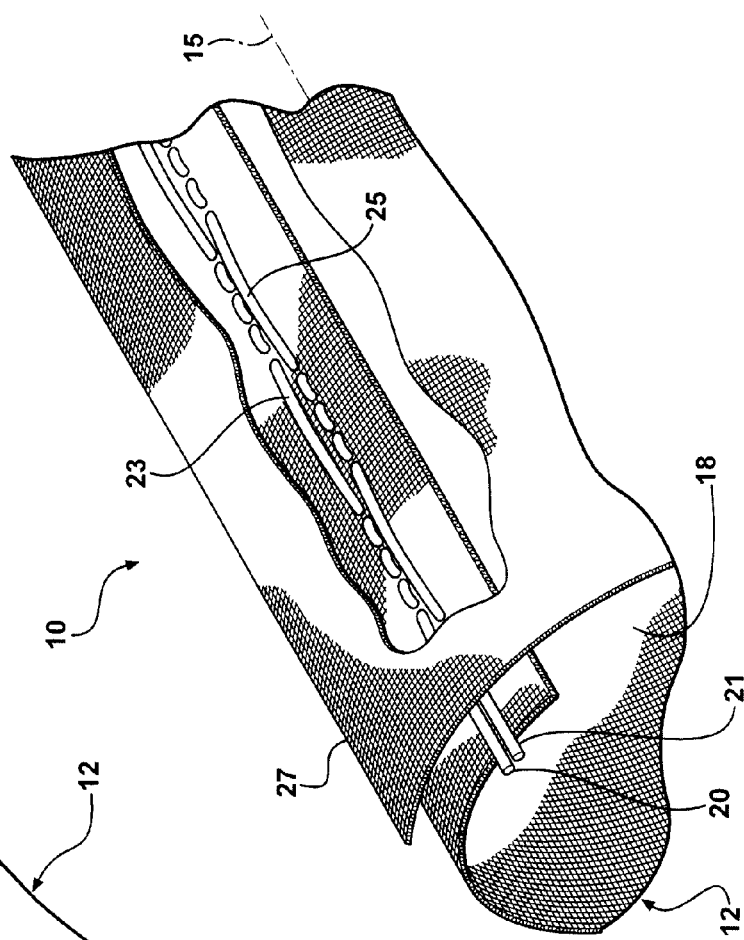
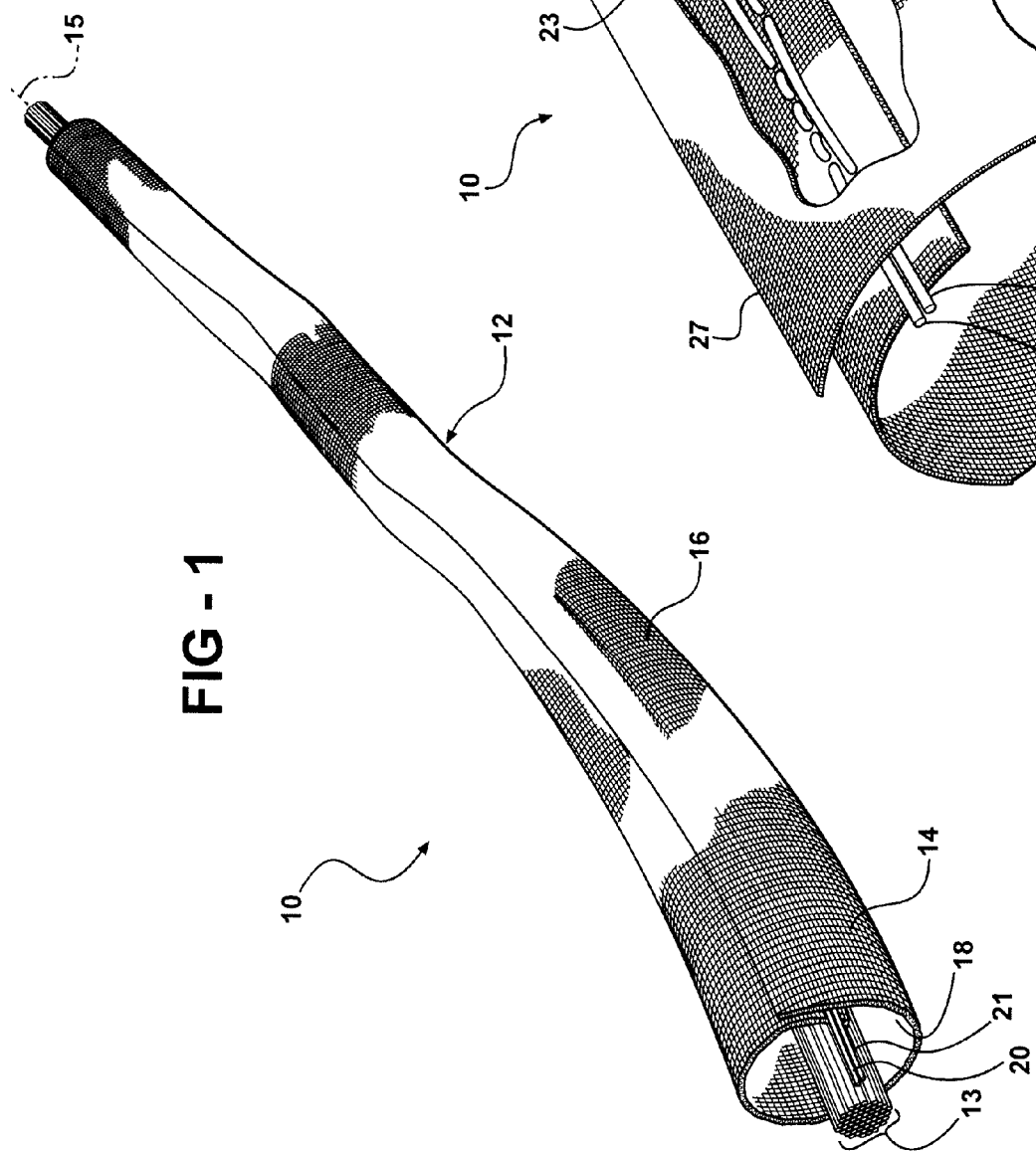

PROTECTIVE SLEEVE FABRICATED WITH HYBRID YARN HAVING WIRE FILAMENTS AND METHODS OF CONSTRUCTION

CROSS-REFERENCE TO RELATED APPLICATION

This application claims priority to U.S. Provisional Application Ser. No. 60/786,847, filed Mar. 29, 2006, which is incorporated herein by reference in its entirety.

BACKGROUND OF THE INVENTION

1. Technical Field

This invention relates generally to sleeves for protecting elongate members and more particularly to EMI/RFI/ESD shielding yarns and sleeves constructed therefrom.

2. Related Art

It is known that electromagnetic interference (EMI), radio frequency interference (RFI), and electrostatic discharge (ESD) can pose a potential problem to the proper functioning of electronic components caused by interference due to inductive coupling between nearby electrical conductors and propagating electromagnetic waves. Electronic systems generate electromagnetic energy due to the flow of current within a circuit. This electromagnetic energy can adversely affect the performance of surrounding electronic components, whether they are in direct communication within the circuit, or located nearby. For example, electrical currents in conductors associated with an electrical power system in an automobile may induce spurious signals in various electronic components, such as an electronic module. Such interference could downgrade the performance of the electronic module or other components in the vehicle, thereby causing the vehicle to act other than as desired. Similarly, inductive coupling between electrical wiring in relatively close relation to lines carrying data in a computer network or other communication system may have a corrupting effect on the data being transmitted over the network.

The adverse effects of EMI, RFI and ESD can be effectively eliminated by proper shielding and grounding of EMI, RFI and ESD sensitive components. For example, wires carrying control signals which may be subjected to unwanted interference from internally or externally generated EMI, RFI and ESD may be shielded by using a protective sleeve. Protective sleeves can be generally flat or cylindrical, wherein the sleeves are formed from electrically conductive and non-conductive constituents, with the conductive constituents typically being grounded via a drain wire interlaced with the yarns during manufacture of the sleeve. Known conductive constituents take the form of non-conductive fibers or filaments, such as nylon, coated with a conductive metal, such as silver. Other known conductive constituents are fabricated by impregnating a non-conductive resin with micro fibers of metal, such as stainless steel, copper or silver, or with micron size conductive powders of carbon, graphite, nickel, copper or silver, such that the micro fibers and/or powders are bonded in conductive communication.

While such RFI, EMI, and ESD sleeving made with coated conductive yarns is generally effective at eliminating electrical interference, the sleeving can be relatively expensive in manufacture, particularly when expensive coatings, such as silver, are used. In addition, conductive coatings can be worn off, leading to inefficiencies in conductive connections between the conductive constituents, thereby impacting the ability of the sleeving to provide optimal RFI, EMI, and/or ESD protection. Accordingly, RFI, EMI, ESD shielding which is more economical in manufacture, and more efficient in use, and more reliable against wear and having an increased useful life, is desired.

A sleeve manufactured from fabric according to the present invention overcomes or greatly minimizes at least those limitations of the prior art described above, thereby allowing components having potential adversarial effects on one another to function properly, even when near one another.

SUMMARY OF THE INVENTION

A fabric sleeve for protecting elongate members against at least one of EMI, RFI or ESD has at least one hybrid yarn filament having a non-conductive filament and at least one continuous conductive wire filament overlying an outer surface of the non-conductive filament. The wire filament is arranged in electrical communication with itself or other ones of the wire filaments along a portion of the sleeve to provide protection to the elongate members against at least one of EMI, RFI or ESD.

Another aspect of the invention includes a method of constructing a fabric sleeve for protecting elongate members against at least one of EMI, RFI or ESD. The method includes providing at least one hybrid yarn filament having a non-conductive filament and at least one continuous conductive wire filament overlying an outer surface of said non-conductive filament, and interlacing the hybrid yarn filament in electrical communication with itself or other ones of the hybrid yarn filaments to form a sleeve or fabric, and forming the fabric into the sleeve.

A further aspect of the invention includes a conductive hybrid yarn for constructing a fabric sleeve for protecting elongate members against at least one of EMI, RFI and/or ESD. The hybrid yarn is interlaced along a length of the sleeve with itself or with other ones of the hybrid yarn. The hybrid yarn has a non-conductive elongate filament, and at least one elongate continuous conductive wire filament overlying and extending outwardly from an outer surface of the non-conductive filament. Accordingly, the wire filament or filaments are able to establish electrical contact with one another. As such, with the wire filaments being continuous wire filaments arranged in electrical communication with one another, the sleeve is provided with optimal conductivity. Thus, effective and uniform EMI, RFI and/or ESD protection is provided to the elongate members housed within the sleeve. In addition, with the hybrid yarns being constructed having a similar denier, the sleeve has an aesthetically pleasing, smooth outer appearance and feel that enhances the useful life of the sleeve, while also having an enhanced abrasion resistance.

Yet another aspect of the invention includes a method of constructing a conductive hybrid yarn used for forming a sleeve, wherein the sleeve provides protection to elongate members against at least one of EMI, RFI and/or ESD. The conductive hybrid yarn or yarns are interlaced in electrical communication with one another. The method includes providing a non-conductive elongate yarn filament and a continuous conductive wire filament, and then, overlying an outer surface of the non-conductive filament with the continuous conductive wire filament.

Accordingly, sleeves produced at least in part with hybrid yarn in accordance with the invention are useful for shielding elongate members from EMI, RFI and/or ESD, wherein the sleeves can be constructed having any desired shape, whether flat, cylindrical, box shaped, or otherwise. In addition, the sleeves can be made to accommodate virtually any package size by adjusting the fabricated width, height, and length in manufacture, and can be equipped with a variety of closure mechanisms. Further, the sleeves are at least somewhat flexible in 3-D without affecting their protective strength, conductivity, and thus shielding ability, thereby allowing the sleeves to bend, as needed, to best route the elongate members without affecting the EMI, RFI and/or ESD protection provided by the sleeves.

BRIEF DESCRIPTION OF THE DRAWINGS

These and other features and advantages will become readily apparent to those skilled in the art in view of the following detailed description of the presently preferred embodiments and best mode, appended claims, and accompanying drawings, in which:

FIG. 1 is a perspective view of a self-wrapping sleeve constructed with yarn according to one presently preferred embodiment of the invention;

FIG. 2 is a schematic fragmentary partially broken away perspective view of the sleeve of FIG. 1;

DETAILED DESCRIPTION OF PREFERRED EMBODIMENTS

Figure 3:
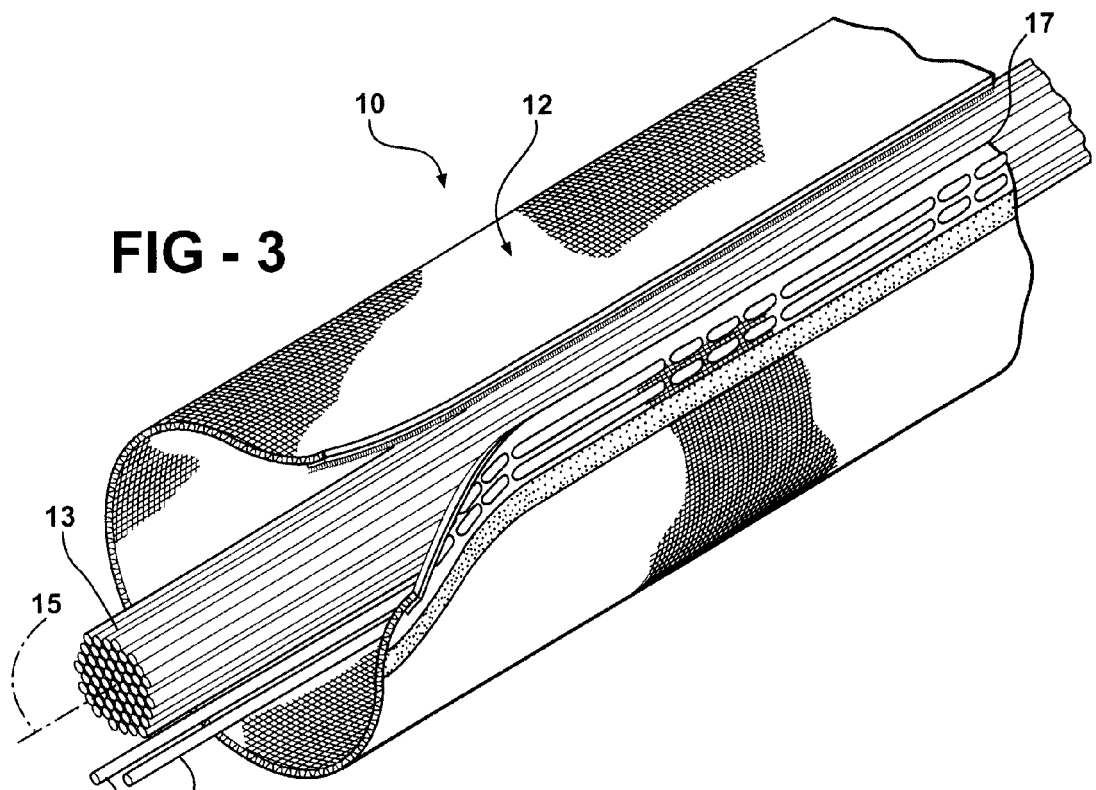
FIG. 3 is a schematic fragmentary perspective view of a sleeve constructed according to another presently preferred embodiment.

Referring in more detail to the drawings, FIG. 1 shows a sleeve 10 constructed from yarn, including at least in part hybrid yarns or filaments, referred to hereafter as hybrid yarn members 12, constructed according to one presently preferred embodiment of the invention. The term filaments herein is meant to include monofilaments and/or multifilaments, with specific reference being given to the type of filament, as necessary. The hybrid yarn members 12 (FIGS. 5-8) are formed with non-conductive monofilament and/or non-conductive multifilament members, referred to hereafter simply as non-conductive members 14, twisted or served with strands of micron-sized continuous conductive wire filaments, referred to hereafter simply as wire filaments 16. The individual wire filaments 16 are about 20-100 μm in diameter, for example, and provide the sleeve 10 with at least one of electromagnetic interference (EMI), radio frequency interference (RFI), and/or electrostatic discharge (ESD) protection for an elongate member or members 13 bundled within the sleeve 10. Once enclosed, the bundle of generally enclosed wires 13 receives optimal protection from any unwanted interference, such as inductive coupling interference or self-induced internal reflective interference, thereby providing any electrical components connected to the bundle of wires 13 with the desired operating efficiency. Accordingly, the sleeve 10 prevents the bundled wires 13 from having a self-induced adverse affect on electrical components to which they are connected, while also preventing interference of the bundled wires 13 with any nearby electrical components not in direct electrical communication therewith.

Figure 4:
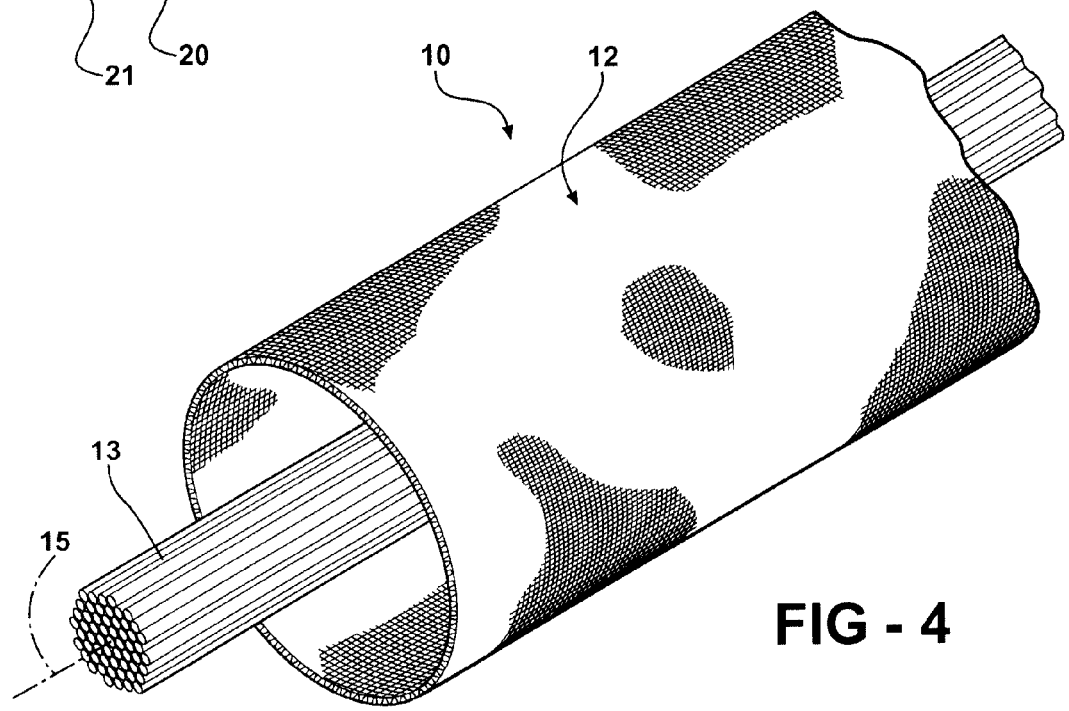
FIG. 4 is a schematic fragmentary perspective view of a sleeve constructed according to yet another presently preferred embodiment of the invention.

As shown in FIGS. 1 and 2, the sleeve 10 is represented, by way of example and without limitations, as being self-wrapping about a longitudinal axis 15, wherein the self-wrapping bias can be imparted via heat-setting, via weft-wise filaments being placed under tension, or via warp-wise filaments exerting a bias about the axis 15, for example, to define an elongate, enclosed channel 18 for receiving the bundled wires 13. At least one or more hybrid yarn members 12 are preferably interlaced with one another in the fill direction and can be constructed at least in part of a thermoplastic, such as, by way of example and without limitation, polyester, thereby allowing the sleeve 10 to be heat-set or otherwise biased into a tubular form. It should be recognized that sleeves 10 constructed with the yarn members 12 can be constructed in any desired protective sleeve form, such as generally flat (FIG. 3, shown before being generally flattened), whether self-closing or assisted, such as via hook and loop fasteners 17, for example, or as a seamless cylindrical form (FIG. 4), for example. Accordingly, the invention is not limited to the profile of the sleeve, and thus, contemplates the manufacture and construction of any profile sleeve that provides a secure, durable, flexible covering for organizing and protecting elongate members 13, such as a wire harness, from EMI, RFI and/or ESD.

To facilitate elimination of any unwanted interference, the sleeve 10 is preferably constructed with at least one, and preferably a pair of drain wires 20, 21 (FIG. 2) interlaced at least partially with the yarn members 12, wherein the drain wires 20, 21 are arranged for suitable connection to a ground (not shown). The drain wires 20, 21 are preferably arranged in electrical communication with one another and in electrical communication with the conductive wire filaments 16. The drain wires 20, 21 can be provided having any suitable diameter, and are generally provided between about 18-24 gauge, and of any suitable metal, such as single strand or twisted multiple strands of tin or nickel plated copper, or stainless steel, for example. The drain wires 20, 21 are oriented to extend lengthwise along the longitudinal axis 15 of the sleeve 10, with at least one of the drain wires 20 preferably being extendable away from the sleeve 10 for operable electrical communication with the ground. The drain wire 20 is shown interlaced at a plurality of axially spaced locations to provide float sections 23, with float section 23 having the ability to be laterally extended from the sleeve 10, as desired. The other drain wire 21 is represented here, for example, as also being interlaced at a plurality of axially spaced locations to provide float sections 25 along the length of the sleeve 10. As represented in FIG. 2, the drain wires 20, 21 can be positioned along a portion of the sleeve 10 so that they can be overlapped and protectively covered by a selvage, referred to hereafter as a free edge 27 of the sleeve 10. It should be recognized that the drain wire 20 or wires 20, 21 are arranged in electrical communication with the conductive wire filaments 16 by virtue of the conductive wire filaments 16 being twisted or served such that they extend outwardly from the non-conductive members 14.

The non-conductive members 14 are preferably provided as multi-filamentary yarns, which provides the sleeve 10 with softer texture, enhanced drape, and enhanced noise dampening characteristics. Though, as mentioned, monofilaments could be used, if desired for the intended application. Depending on the application, the non-conductive members 14 can be formed from, by way of example and without limitation, polyester, nylon, polypropylene, polyethylene, acrylic, cotton, rayon, and fire retardant (FR) versions of all the aforementioned materials when extremely high temperature ratings are not required. If higher temperature ratings are desired along with FR capabilities, then the non-conductive members 14 could be constructed from, by way of example and without limitation, materials including m-Aramid (sold under names Nomex, Conex, Kermel, for example), p-Aramid (sold under names Kevlar, Twaron, Technora, for example), PEI (sold under name Ultem, for example), PPS, LCP, TPFE, and PEEK. When even higher temperature ratings are desired along with FR capabilities, the non-conductive members can include mineral yarns such as fiberglass, basalt, silica and ceramic, for example.

As mentioned, the continuous conductive wire filaments 16 can be either served with the non-conductive member 14 (FIG. 5), such that the non-conductive member 14 extends along a generally straight path, while the conductive wire filament 16 extends along a helical path about the non-conductive member 14, or twisted with the non-conductive members 14 (FIG. 6), such that they form axially offset helical paths relative to one another. Regardless of how constructed, it is preferred that at least a portion of the conductive wire filaments 16 remain or extend radially outward of an outer surface 24 (FIGS. 5-8) of the non-conductive members 14. This facilitates maintaining effective EMI, RFI and/or ESD shielding properties of the sleeve 10 constructed at least in part from the hybrid yarn members 12. The conductive wire filaments 16 are preferably provided as continuous strands of stainless steel, such as a low carbon stainless steel, for example, SS316L, which has high corrosion resistance properties, however, other conductive continuous strands of metal wire could be used, such as, copper, tin or nickel plated copper, aluminum, and other conductive alloys, for example.

As shown in FIGS. 5-8, the continuous conductive wire filaments 16 can overlie the non-conductive members 14 by being twisted or served about the non-conductive members 14 to form the hybrid yarn members 12 having a single strand conductive wire filament 16 (FIGS. 5 and 6), two strands of conductive wire filaments 16 (FIG. 7), three strands of conductive wire filaments 16 (FIG. 8), or more, as desired, extending substantially along the length of the hybrid yarn members 12. It should be recognized that any desired number of conductive wire filaments 16 can be used, depending on the conductivity and shielding sought, with the idea that an increased number of conductive wires along the length of the hybrid yarn members 12 generally increases the conductive properties of the hybrid yarn members 12. When two or more conductive wire filaments 16 are used, they can be arranged to overlap one another, such as, by way of example and without limitation, by having different helical angles and/or by twisting or serving the wire filaments 16 in opposite helical directions, as shown here. Regardless of how many conductive wire filaments 16 are used, it is preferable that they remain at least partially exposed outwardly from the outer surface 24 of the non-conductive members 14 to maximize the EMI, RFI and/or ESD shielding properties of the hybrid yarn members 12.

Figure 5:
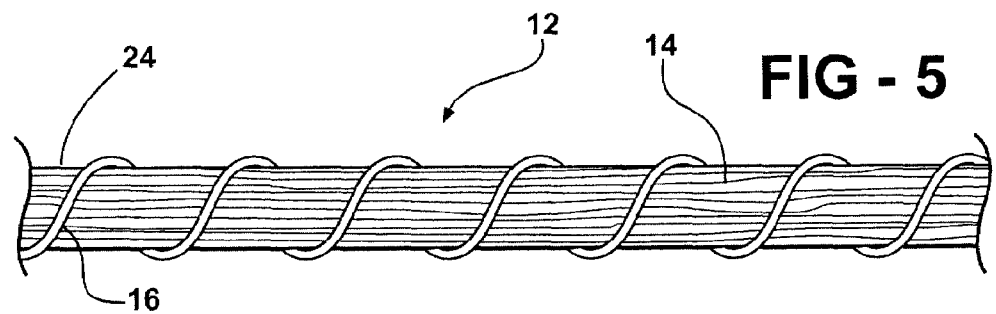
FIG. 5 is an enlarged schematic view of a yarn constructed according to one presently preferred embodiment.
Figure 6:
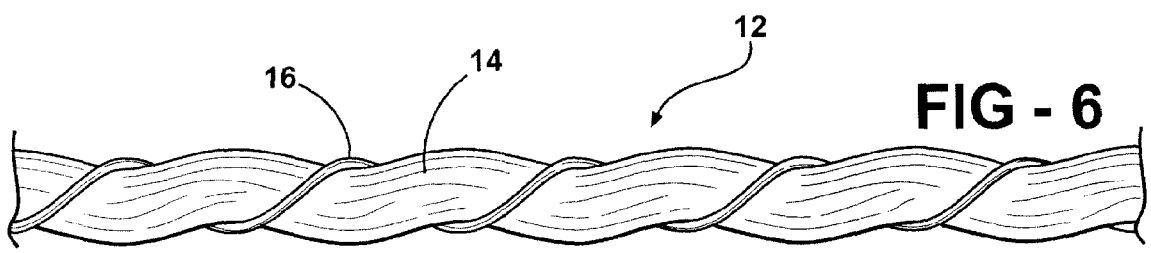
FIG. 6 is an enlarged schematic view of a yarn constructed according to another presently preferred embodiment.
Figure 7:
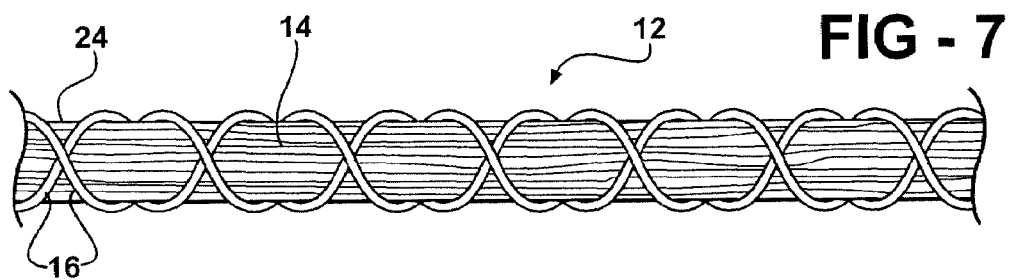
FIG. 7 is an enlarged schematic view of a yarn constructed according to another presently preferred embodiment.
Figure 8:
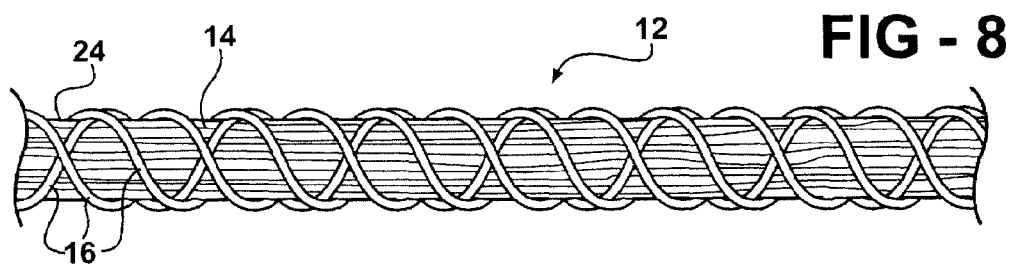
FIG. 8 is an enlarged schematic view of a yarn constructed according to yet another presently preferred embodiment.

The arrangement of the wire filaments 16, and their specific construction, whether having single, double, triple, or more conductive wires 16, used in constructing the hybrid yarn members 12, is selected to best maximize the shielding potential desired. In a woven fabric construction, it is generally preferred that the hybrid yarn members 12 traversing the warp direction of the sleeve 10 have at least two or more conductive wire filaments 16, as best shown in FIGS. 7 and 8. Conversely, it is generally preferred that the hybrid yarn members 12 traversing the weft or fill direction of the sleeve 10 have a single conductive wire 16, as best shown in FIGS. 5 and 6. This construction provides the resulting sleeve 10 with optimal EMI, RFI, and ESD shielding capabilities, while also providing the sleeve 10 with maximum drape about the longitudinal axis 15, which can facilitate forming the sleeve 10 into the desired shape, whether flat or generally cylindrical. It should be recognized that the conductive wire filament or filaments 16 are preferably maintained in electrical communication with themselves or other ones of the filaments 16. As such, for example, wire filaments 16 traversing the warp direction are maintained in electrical contact with the conductive wire filaments 16 traversing the fill direction, thereby establishing a complete grid or network of EMI, RFI and/or ESD shielding about the outer surface of the sleeve 10. This is particularly made possible by the conductive wire filaments 16 extending radially outward from the non-conductive filaments 14, as discussed.

An additional consideration given in the construction of the hybrid yarn members 12 is to best provide the hybrid yarns 12 in both the fill and warp directions with a generally similar denier. As such, given that each of the fill hybrid yarn members 12 preferably have a single conductive wire filament 16, the associated underlying nonconductive filaments 14 preferably have a larger denier in comparison to the nonconductive filaments 14 used in the warp hybrid yarn members 12, which, as mentioned, preferably have two or more conductive wire filaments 16. By providing the fill and warp hybrid yarns 12 with approximately the same denier, the resulting sleeve fabric has a smoother appearance and feel, thereby enhancing the abrasion resistance of the resulting sleeve 10.

For example, a fill hybrid yarn member 12 could have a single continuous strand of stainless steel wire filament 16, between about 20-100 µm in diameter, and in one example, about 50 µm in diameter (this diameter of wire in our examples equates to about 140 denier), twisted or served about non-conductive PET multifilament 14 of about 1100 denier, thereby resulting in the hybrid yarn member 12 being about 1240 denier, and a warp hybrid yarn member 12 could have two continuous strands of stainless steel wire filament 16, between about 20-100 µm in diameter, and in this example, about 50 µm in diameter, twisted or served about non-conductive PET multifilament 14 of about 970 denier, thereby resulting in the hybrid yarn member 12 being about 1250 denier. Thus, the resulting deniers of the warp and fill hybrid yarns 12 being approximately equal to one another.

In another example, a hybrid fill yarn member 12 could have a single continuous strand of stainless steel wire filament 16, between about 20-100 µm in diameter, and in this example, about 50 µm in diameter, twisted or served about non-conductive PET multifilament 14 of about 1100 denier, thereby resulting in the hybrid yarn member 12 being about 1240 denier, and a hybrid warp yarn member 12 could have three continuous strands of stainless steel wire filament 16, between about 20-100 µm in diameter, and in this example, about 50 µm in diameter, twisted or served about PET non-conductive multifilament 14 of about 830 denier, thereby resulting in the hybrid yarn member 12 being about 1250 denier. So, again, the resulting fill and warp direction hybrid yarns 12 are approximately the same denier.

In yet another example, a hybrid fill yarn member 12 could have a single continuous strand of stainless steel wire filament 16, between about 20-100 µm in diameter, and in this example, about 35 µm in diameter (this diameter of wire in our examples equates to about 70 denier), twisted or served about non-conductive m-Aramid multifilament 14 of about 530 denier, thereby resulting in the hybrid yarn member 12 being about 600 denier, and a hybrid warp yarn member 12 could have two continuous ends, between about 20-100 µm in diameter, and in this example, about 35 µm in diameter, of stainless steel wire filament 16 twisted or served about m-Aramid non-conductive multifilament 14 of about 460 denier, thereby resulting in the hybrid yarn member 12 being about 600 denier. Therefore, the resulting fill and warp hybrid yarns 12 are again approximately the same denier.

In yet a further example, a hybrid fill yarn member 12 could have a single continuous strand of stainless steel wire filament 16, between about 20-100 μm in diameter, and in this example, about 35 μm in diameter, twisted or served about non-conductive m-Aramid multifilament 14 of about 530 denier, thereby resulting in the hybrid yarn member 12 being about 600 denier, and a hybrid warp yarn member 12 could have three continuous strands of stainless steel wire filament 16, between about 20-100 μm in diameter, and in this example, about 35 μm in diameter, twisted or served about m-Aramid non-conductive multifilament 14 of about 390 denier, thereby resulting in the hybrid yarn member 12 being about 600 denier. Again, the resulting deniers of the hybrid fill and warp yarns 12 are approximately the same.

Accordingly, as the examples above demonstrate, without limitation, numerous constructions and arrangements of fill and warp hybrid yarns 12 are possible. Further, as mentioned, more warp conductive wire filaments 16 could be used to effectively increase the conductivity of the conductive hybrid yarn members 12, thereby enhancing the EMI, RFI and/or ESD shielding effectiveness, with the resulting deniers of the warp and fill hybrid yarn members 12 preferably remaining approximately equal to one another.

Another aspect of the invention includes a method of constructing the fabric sleeves 10 described above for protecting elongate members against at least one of EMI, RFI and/or ESD. The method includes providing at least one or more hybrid yarn members 12 each having a non-conductive elongate filament 14 and at least one elongate continuous conductive wire filament 16 overlying an outer surface of the non-conductive filament 14. Next, interlacing the hybrid yarn members 12 with one another, such as in warp and fill directions, for example to form a fabric, wherein the wire filaments 16 extending along the warp direction are brought into direct conductive electrical communication with the wire filaments 16 extending along the fill direction. It should be understood that the fabric sleeve can be constructed via weaving, knitting, crochet knitting, or braiding techniques. As such, it should be recognized that the method includes additional steps, as necessary, to arrive at the specific sleeve constructions described above, and desired. It should be further understood that if the resulting sleeve is braided, crocheted, or knitted using other than warp or weft knitting forms of knitting, that the use of warp and weft directions above may not apply to the sleeves constructed from these methods of construction. Regardless, it is to be understood that the hybrid yarn members 12 can be interlaced using virtually any textile construction method to form a protective sleeve In addition, the sleeves 10 constructed from the hybrid yarn members 12 can be constructed to conform to a multitude of widths, heights and lengths and configurations for use in a variety of applications.

Obviously, many modifications and variations of the present invention are possible in light of the above teachings. It is, therefore, to be understood that within the scope of the appended claims, the invention may be practiced otherwise than as specifically described.

What is claimed is:

1. A fabric sleeve for protecting elongate members against at least one of EMI, RFI or ESD, comprising:
at least one hybrid yarn filament having a non-conductive filament and at least one continuous conductive wire filament overlying an outer surface of said non-conductive filament and extending radially outward from an adjacent portion of said outer surface;
wherein said wire filament is interlaced in electrical communication with itself or with other ones of said wire filaments along a portion of said sleeve to provide protection to the elongate members against at least one of EMI, RFI or ESD;
wherein a plurality of yarn filaments extend along a warp direction corresponding to a length of the sleeve, at least some of said warp direction yarn filaments being provided as said at least one hybrid yarn filament and a plurality of yarn filaments extend along a fill direction generally perpendicular to said warp direction, at least some of said fill direction yarn filaments being provided as said at least one hybrid yarn filament, said wire filaments overlying said warp direction non-conductive filaments are in electrical communication with said wire filaments overlying said fill direction non-conductive filaments; and
wherein said at least some of said warp direction yarn filaments or said at least some of said fill direction yarn filaments have at least two of said continuous conductive wire filaments and the other of said at least some of said warp direction yarn filaments or said at least some of said fill direction yarn filaments have a single one of said continuous conductive wire filaments.

2. The fabric sleeve of claim 1 wherein each of said warp direction yarn filaments have said non-conductive filament and said at least one continuous conductive wire filament overlying an outer surface of said non-conductive filaments.

3. The fabric sleeve of claim 2 wherein each of said fill direction yarn filaments have said non-conductive filament and said at least one continuous conductive wire filament overlying an outer surface of said fill direction non-conductive filaments.

4. The fabric sleeve of claim 3 wherein each of said conductive wire filaments in said warp direction are in electrical communication with each of said conductive wire filaments in said fill direction.

5. The fabric sleeve of claim 1 wherein said at least two of continuous conductive wire filaments are arranged in opposite helical directions to one another.

6. The fabric sleeve of claim 1 wherein at least some of said warp direction yarn filaments or said fill direction yarn filaments have at least three of said continuous conductive wire filaments overlying an outer surface of said non-conductive filament.

7. The fabric sleeve of claim 6 wherein said fill direction yarn filaments have a single one of said continuous conductive wire filaments.

8. The fabric sleeve of claim 7 wherein said warp direction yarn filaments are substantially the same denier as said fill direction yarn filaments.

9. The fabric sleeve of claim 6 wherein at least one of said three continuous wire filaments has a helical angle that is different from the remaining continuous wire filaments.

10. The fabric sleeve of claim 1 wherein said warp direction yarn filaments are substantially the same denier as said fill direction yarn filaments.

11. The fabric sleeve of claim 1 further including at least one interlaced drain wire arranged in electrical communication with said at least one conductive wire filament.

12. The fabric sleeve of claim 11 wherein said at least one drain wire is interlaced at axially spaced locations along the length of said sleeve to form float sections of said drain wire.

13. The fabric sleeve of claim 1 wherein said non-conductive filament is a multifilament.

14. The fabric sleeve of claim 1 wherein said at least one conductive wire filament is between about 20-100 μm in diameter.

15. The fabric sleeve of claim 1 wherein said sleeve has opposite free edges extending along the length of said sleeve, said sleeve being biased into a self-wrapped shape so that said edges overlap one another.

16. The fabric sleeve of claim 15 wherein said sleeve includes heat-settable yarns that are heat-set into said self wrapped shape.

17. The fabric sleeve of claim 16 wherein said heat-settable yarns are monofilaments of thermoplastic.

18. The fabric sleeve of claim 15 wherein said sleeve has yarns placed in tension to bias said sleeve into said self wrapped shape.

19. The fabric sleeve of claim 15 further including at least one fastener arranged to maintain said opposite edges in releasable attached relation with one another.

20. The fabric sleeve of claim 19 wherein said at least one fastener includes hooks attached adjacent one of said free edges and loops attached adjacent the other of said free edges.

21. The fabric sleeve of claim 1 wherein said sleeve has a seamless wall extending circumferentially about said sleeve.

22. The fabric sleeve of claim 1 wherein said at least one conductive wire filament is twisted with said non-conductive filament.

23. The fabric sleeve of claim 1 wherein said at least one conductive wire filament is served about said non-conductive filament.

24. A fabric sleeve for protecting elongate members against at least one of EMI, RFI or ESD, comprising:

at least one hybrid yarn filament having a non-conductive filament and at least one continuous conductive wire filament overlying an outer surface of said non-conductive filament;

wherein said wire filament is interlaced in electrical communication with itself or with other ones of said wire filaments along a portion of said sleeve to provide protection to the elongate members against at least one of EMI, RFI or ESD;

wherein a plurality of yarn filaments extend along a warp direction corresponding to a length of the sleeve, at least some of said warp direction yarn filaments being provided as said at least one hybrid yarn filament and a plurality of yarn filaments extend along a fill direction generally perpendicular to said warp direction, at least some of said fill direction yarn filaments being provided as said at least one hybrid yarn filament, said wire filaments overlying said warp direction non-conductive filaments are in electrical communication with said wire filaments overlying said fill direction non-conductive filaments;

wherein said at least some of said warp direction yarn filaments have at least two of said continuous conductive wire filaments;

wherein said at least some of said fill direction yarn filaments have a single one of said continuous conductive wire filaments; and wherein said non-conductive filament in said at least some of said warp direction yarn filaments has a smaller denier than said non-conductive filament in said at least some of said fill direction yarn filaments.

25. The fabric sleeve of claim 24 wherein said warp direction yarns are substantially the same denier as said fill direction yarns.

* * * * *